(12) United States Patent
Illium et al.

(10) Patent No.: US 8,378,575 B2
(45) Date of Patent: Feb. 19, 2013

(54) MOTOR VEHICLE HAVING A HATCHBACK

(75) Inventors: Justus Illium, Mainz (DE); Torsten Kanning, Eltville/Erbach (DE)

(73) Assignee: GM Global Technology Operations LLC, Detroit, MI (US)

( * ) Notice: Subject to any disclaimer, the term of this patent is extended or adjusted under 35 U.S.C. 154(b) by 405 days.

(21) Appl. No.: 12/666,554

(22) PCT Filed: Jun. 23, 2008

(86) PCT No.: PCT/EP2008/005053
§ 371 (c)(1),
(2), (4) Date: Jun. 2, 2010

(87) PCT Pub. No.: WO2009/000488
PCT Pub. Date: Dec. 31, 2008

(65) Prior Publication Data
US 2010/0244697 A1    Sep. 30, 2010

(30) Foreign Application Priority Data

Jun. 28, 2007   (DE) .......................... 10 2007 029 864

(51) Int. Cl.
*H01K 7/00* (2006.01)
*B60Q 1/00* (2006.01)
(52) U.S. Cl. ............. 315/77; 315/84; 362/496; 362/542
(58) Field of Classification Search ............ 315/76, 315/77, 84; 362/253, 234, 496, 540–542
See application file for complete search history.

(56) References Cited

U.S. PATENT DOCUMENTS

| 2,054,919 | A | 9/1936 | Anibal |
| 5,923,245 | A | 7/1999 | Klatt et al. |
| 6,350,049 | B1 * | 2/2002 | Zimmermann et al. ...... 362/496 |
| 7,273,304 | B2 * | 9/2007 | Bischoff et al. ............... 362/496 |
| 2001/0033086 | A1 | 10/2001 | Yuge et al. |
| 2005/0028912 | A1 * | 2/2005 | Schnarr ......................... 150/166 |

FOREIGN PATENT DOCUMENTS

| DE | 9007426 U1 | 7/1991 |
| DE | 4101418 A1 | 9/1991 |
| DE | 19533804 A1 | 3/1996 |
| DE | 19652692 C1 | 6/1998 |
| DE | 19706043 A1 | 6/1998 |

(Continued)

OTHER PUBLICATIONS

German Patent Office, German Search Report for German Application No. 102007029864.3, dated Mar. 7, 2008.

(Continued)

*Primary Examiner* — Don Le
(74) *Attorney, Agent, or Firm* — Ingrassia Fisher & Lorenz, P.C.

(57) ABSTRACT

A motor vehicle is provided that has a passenger compartment, a hatchback, which is mounted so it is pivotable on the passenger compartment, external lighting having taillights, which are fastened on the hatchback, and additional taillights, which are concealed when the hatchback is closed and are visible from outside the motor vehicle when the hatchback is open.

15 Claims, 6 Drawing Sheets

FOREIGN PATENT DOCUMENTS

| | | | |
|---|---|---|---|
| DE | 19909278 | A1 | 8/2000 |
| DE | 10147584 | A1 | 6/2002 |
| DE | 10211463 | B3 | 1/2004 |
| DE | 10312252 | A1 | 9/2004 |
| DE | 102006014561 | B3 | 10/2007 |
| EP | 1031462 | A2 | 8/2000 |
| EP | 1116850 | A2 | 7/2001 |
| FR | 2764852 | A1 | 12/1998 |
| FR | 2765166 | A1 | 12/1998 |
| JP | 2005349976 | A | 12/2005 |

OTHER PUBLICATIONS

ISA European Patent Office, International Search Report for International Application No. PCT/EP2008/005053, dated Oct. 7, 2008.

* cited by examiner

MOTOR VEHICLE HAVING A HATCHBACK

CROSS-REFERENCE TO RELATED APPLICATIONS

This application is a U.S. National-Stage entry under 35 U.S.C. §371 based on International Application No. PCT/EP2008/005053, filed Jun. 23, 2008, which was published under PCT Article 21(2) and which claims priority to German Application No. 102007029864.3, filed Jun. 28, 2007, which are all hereby incorporated in their entirety by reference.

TECHNICAL FIELD

The invention relates to a motor vehicle having a hatchback, on which taillights of the motor vehicle are situated.

BACKGROUND

Motor vehicles are equipped, inter alia, which taillights so that even in poor light conditions or darkness and with the taillights turned on, the motor vehicle can be recognized from the rear. Furthermore, motor vehicles have a rear hatchback, e.g., a trunk lid, on which the taillights may be fastened, as disclosed, for example, in DE 101 47 584 A1. If the hatchback is opened, the taillights pivot with the hatchback and are then are possibly visible poorly or not at all.

At least one object of the present invention is therefore to disclose a motor vehicle having a hatchback, on which taillights of the motor vehicle are situated, which is illuminated on its rear side even with the hatchback open. In addition, other objects, desirable features, and characteristics will become apparent from the subsequent summary and detailed description, and the appended claims, taken in conjunction with the accompanying drawings and this background.

SUMMARY

The at least one object, other objects, desirable features and characteristics, is achieved by a motor vehicle having a passenger compartment, a hatchback mounted so it is pivotable on the passenger compartment, external lighting having taillights, which are fastened on the hatchback, and additional taillights, which are concealed when the hatchback is closed and are visible from outside the motor vehicle when the hatchback is open. The motor vehicle according to the invention has the passenger compartment, on which the hatchback is situated so it is pivotable, as is typical. The tail of the motor vehicle is a fastback, for example, the motor vehicle can particularly be a so-called station wagon or the hatchback can be a trunk lid.

The motor vehicle according to an embodiment of the invention also has the external lighting, which in turn comprises the taillights, which are situated on the hatchback and accordingly pivot with the hatchback when it is opened. In addition, the motor vehicle has the additional taillights which are concealed by the hatchback when it is closed. The additional taillights are situated on the passenger compartment, for example.

In contrast, the open hatchback does not conceal the additional taillights at least when the hatchback is completely open, whereby they are visible from outside the motor vehicle. The motor vehicle according to the invention thus has rear external lighting even when the hatchback is open. The additional taillights may particularly be set up so that their light meets the legal requirements for taillights.

The additional taillights may first be turned on automatically when an opening angle of the open hatchback is greater than a minimum opening angle. The additional taillights may be turned off automatically below this minimum opening angle. When the hatchback is closed, it is not necessary for the additional taillights to be turned on. The taillights of the external lighting may also be oriented in such a way that when the hatchback is slightly open, a person who controls a motor vehicle driving behind the motor vehicle according to the invention can still sufficiently perceive it. It is thus unnecessary to already turn on the taillights when the hatchback is slightly open, in particular when they are still also at least partially concealed by the hatchback. This variant of the motor vehicle according to an embodiment of the invention therefore allows energy savings, because unnecessarily turning on the additional taillights can be avoided. Furthermore, it is possible that when the hatchback is partially open, the light emitted by the additional taillights is at least partially reflected from the rear window of the hatchback or the hatchback paneling and possibly dazzles the person controlling the motor vehicle according to the invention. Because, according to this variant of the motor vehicle according to the invention, the additional taillights are first turned on automatically from the minimum opening angle, conditions result so that the person controlling the motor vehicle according to the invention is not dazzled by the additional taillights.

The taillights of the external lighting may also be turned off automatically when the opening angle of the open hatchback is greater than the minimum opening angle. If the hatchback is opened in such a way that the person who controls a motor vehicle driving behind the motor vehicle according to the invention can no longer adequately perceive the taillights of the external lighting, the taillights of the external lighting also no longer need to be turned on. This embodiment of the motor vehicle according to the invention therefore offers a condition for lower power consumption.

According to one embodiment of the motor vehicle according to the invention, it has an angle measuring device, which is set up to ascertain the opening angle of the hatchback. The angle measuring device can be part of a device for automatically opening and/or closing the hatchback, for example. Using such devices, the hatchback can be opened or also closed again using electrical drives, for example. If these devices comprise the angle measuring device, e.g., in the form of an angle sensor, the measuring signal of this angle measuring device can also be used for turning on and off the additional taillights and/or the taillights of the external lighting as a function of the opening angle of the hatchback.

The motor vehicle according to an embodiment of the invention can have a gas-filled shock absorber or a gas-filled spring for damping the movement of the hatchback. The angle measuring device can then be situated in or on the gas-filled spring or integrated therein.

According to one variant of the motor vehicle according to an embodiment of the invention, it has an analysis device, which is set up to analyze the opening angle ascertained by the angle measuring device and turn on and off the additional taillights and/or the taillights of the external lighting on the basis of the analyzed opening angle. This analysis device can be an independent analysis device associated with the additional taillights. However, the analysis device can also be a central analysis device of the motor vehicle according to an embodiment of the invention, which is provided to control further functions of the motor vehicle, for example.

The additional taillights and/or the taillights of the external lighting may also be turned on and off as a function of the opening angle of the hatchback using a switch contact. The switch contact can be situated on the gas-filled spring, for example. The switch contact can be a mechanical or magnetic switch contact, for example. The recognition of the minimum angle can also be implemented using inductive measurement, however.

When the hatchback is not completely opened, it is possible that the additional taillights are still at least partially concealed by the hatchback and additionally the light of the taillights of the external lighting is no longer emitted so that a person driving behind the motor vehicle adequately perceives this light. It is then possible that the legal requirements for the rear lighting are no longer met. In order to avoid such a situation, the vehicle can generate an acoustic and/or visual warning signal and/or make starting the motor vehicle impossible, if an opening angle of the open hatchback is greater than the first minimum opening angle, but less than a second minimum opening angle, the first minimum opening angle being less than the second minimum opening angle.

The second minimum opening angle can particularly be selected so that upon reaching the second minimum opening angle, the hatchback no longer conceals the additional taillights, so that they may be turned on automatically in order to meet the legal requirements in regard to emitted light values in particular. For this case, the taillights of the external lighting may be turned off automatically.

The first minimum opening angle can be selected so that if the opening angle is less than the first minimum opening angle, the emission angle of light of the taillights of the external lighting is still sufficient to be seen by trailing traffic, but it is no longer sufficient if the opening angle is greater than the first minimum opening angle. The additional taillights may then remain turned off. If the opening angle is between the two minimum opening angles, the motor vehicle according to an embodiment of the invention does not meet the legal requirements and the warning signal sounds and/or the motor vehicle cannot be started. The warning signal can be a blinking reverse headlight of the motor vehicle, for example.

BRIEF DESCRIPTION OF THE DRAWINGS

The present invention will hereinafter be described in conjunction with the following drawing figures, wherein like numerals denote like elements, and.

DETAILED DESCRIPTION

Figure 1:
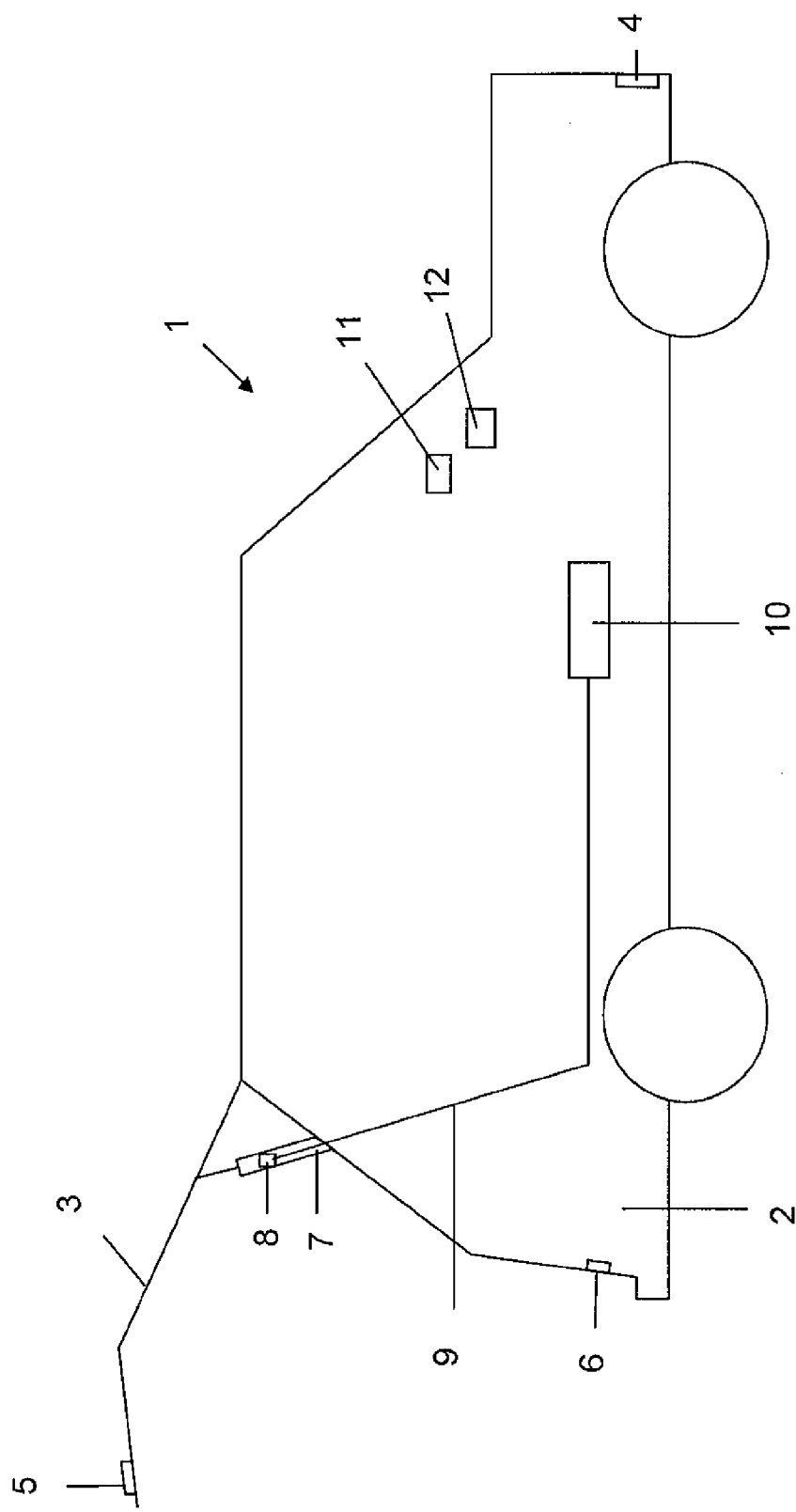
FIG. 1 shows a motor vehicle having a completely open hatchback.

The following detailed description is merely exemplary in nature and is not intended to limit application and uses. Furthermore, there is no intention to be bound by any theory presented in the preceding background or summary or the following detailed description.

FIG. 1 through FIG. 4 show a motor vehicle 1 having a passenger compartment 2 and a hatchback 3, which is mounted so it is pivotable on the passenger compartment 2. The motor vehicle 1 also has external lighting, which comprises headlights 4 and taillights 5, inter alia. The headlights 4 are situated in the front part of the motor vehicle 1 and the taillights 5 are fastened to the hatchback 3.

Figure 2:
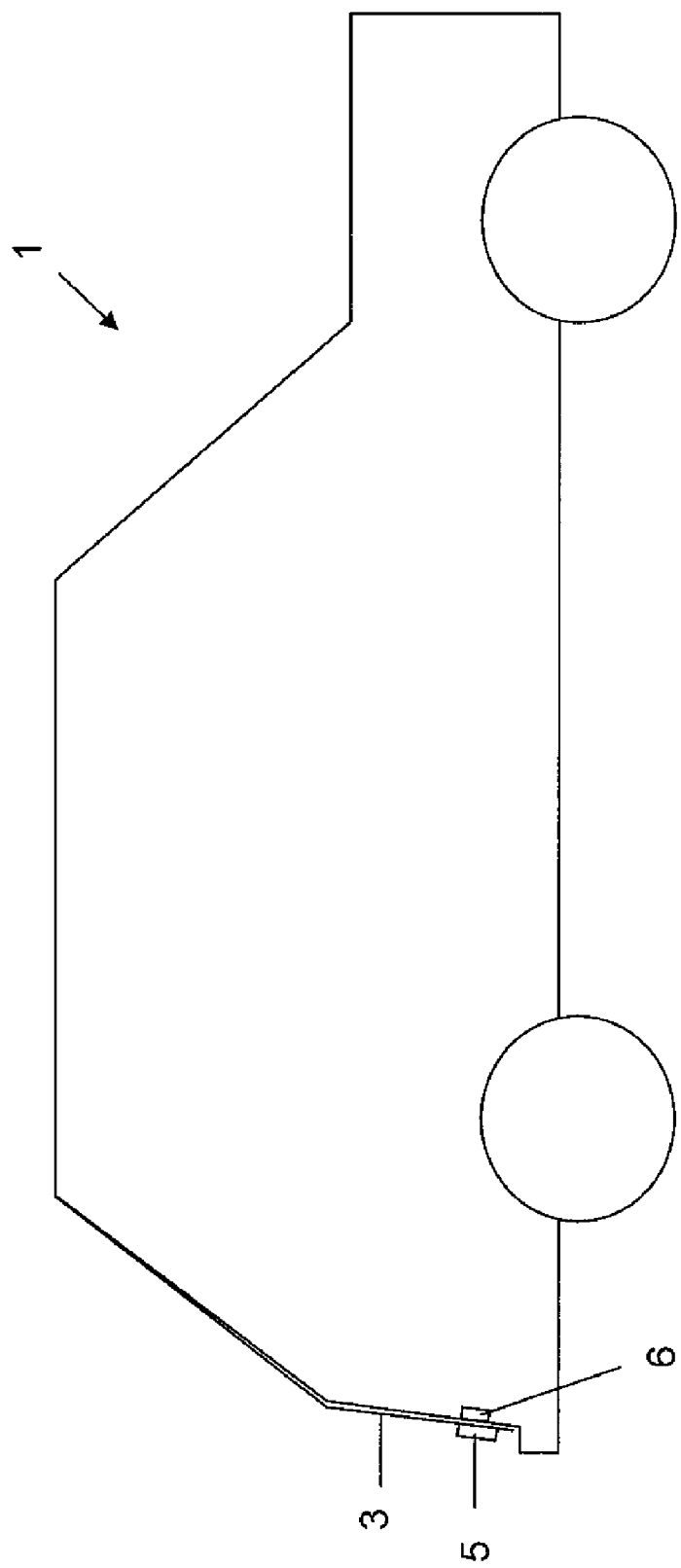
FIG. 2 shows the motor vehicle of FIG. 1 with closed hatchback.
Figure 3:
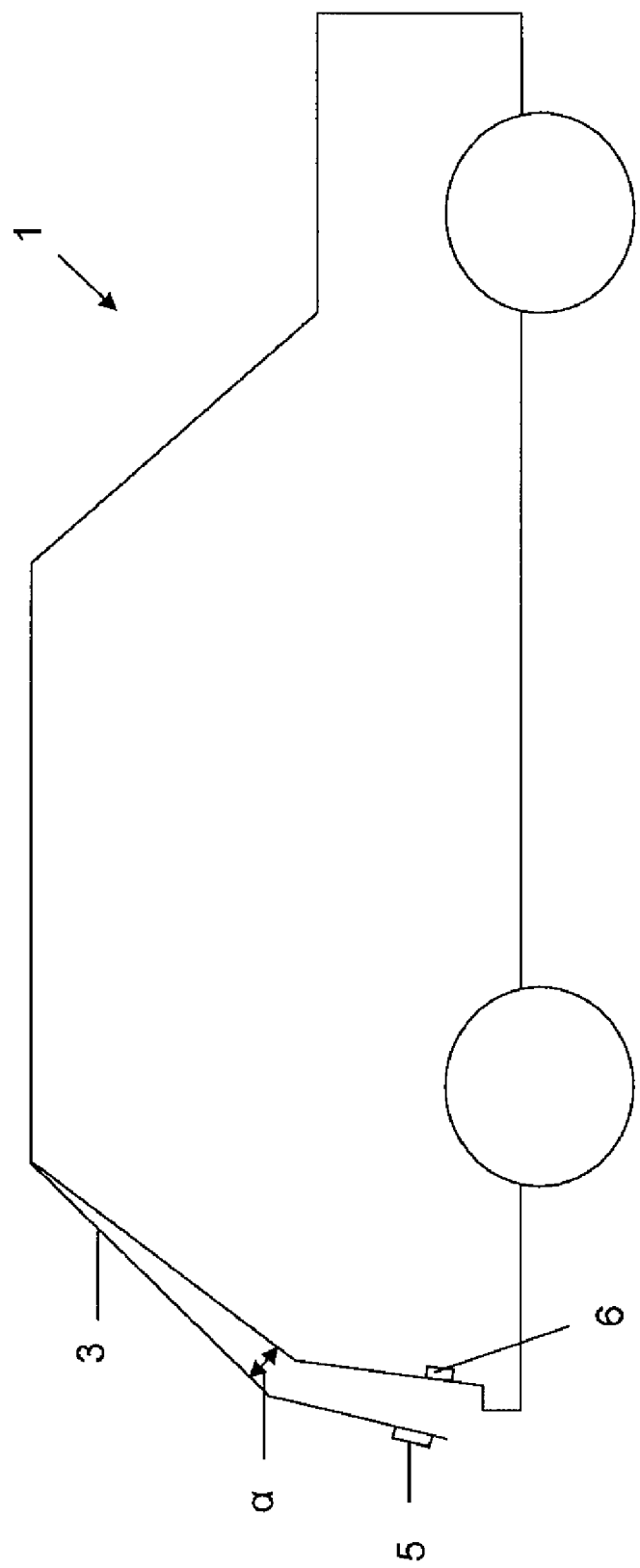
FIG. 3 shows the motor vehicle of FIG. 1, whose hatchback is open at a first opening angle.
Figure 4:
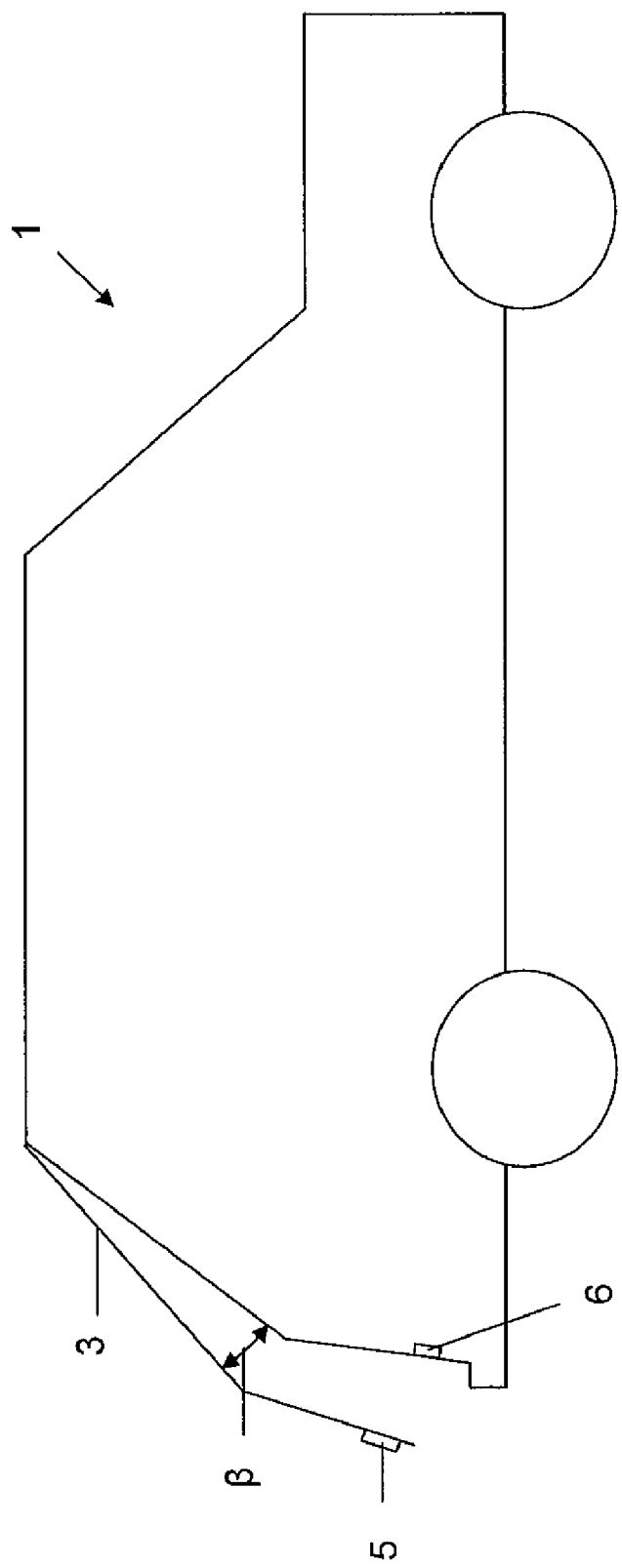
FIG. 4 shows the motor vehicle of FIG. 1, whose hatchback is open at a second opening angle.

The hatchback 3 is mounted so it is pivotable on the passenger compartment 2 and can be pivoted between a closed position shown in FIG. 2 and a completely open position shown in FIG. 1. Positions in which the hatchback 3 is partially open are shown in FIG. 3 and FIG. 4.

The taillights 5 of the external lighting of the motor vehicle 1 are fastened on the hatchback 3, so that they are also pivoted upon pivoting of the hatchback 3. The taillights 5 of the external lighting thus no longer emit their light in the direction of a motor vehicle (not shown in greater detail) which is potentially driving behind the motor vehicle 1.

The motor vehicle 1 also comprises additional taillights 6, which are fastened on the passenger compartment 2 in the case of the present exemplary embodiment, so that they are concealed by the closed hatchback 3, but when the hatchback 3 is open, their light may radiate to the rear in relation to the motor vehicle 1.

In the case of the present exemplary embodiment, the motor vehicle 1 has a gas-filled spring 7, which damps a movement of the hatchback 3. The gas-filled spring 7 is only shown in FIG. 1. An angle sensor 8, which measures the opening angle of the hatchback 3, is integrated in the gas-filled spring.

In the case of the present exemplary embodiment, the angle sensor 8 is connected using an electrical line 9 to a central control unit 10 of the motor vehicle 1. The central control unit 10 has, for example, a microcontroller or microprocessor, on which a computing program runs, which compares the opening angle of the hatchback 3 ascertained by the angle sensor 8 to a first minimum opening angle $\alpha$ and to a second minimum opening angle $\beta$, the first minimum opening angle $\alpha$ being less than the second minimum opening angle $\beta$.

In the case of the present exemplary embodiment, the first minimum opening angle $\alpha$ is selected so that light emitted by the taillights 5 fastened on the hatchback 3 only meets legal requirements in regard to the external lighting of the motor vehicle 1 up to opening angles of the hatchback 3 less than the first minimum opening angle $\alpha$, i.e., if the hatchback 3 is open further than the first minimum opening angle $\alpha$, light of the taillights 5 of the external lighting can no longer be adequately perceived by persons driving behind the motor vehicle 1. FIG. 3 shows the hatchback 3 at an opening angle equal to the first minimum opening angle $\alpha$.

In the case of the present exemplary embodiment, the second minimum opening angle $\beta$ is selected so that the hatchback 3, at opening angles less than the second minimum opening angle $\beta$, at least partially conceals the additional taillights 6 fastened on the passenger compartment 2 and, at opening angles greater than the second minimum opening angle $\beta$, the additional taillights 6 fastened on the passenger compartment 2 are visible from outside the motor vehicle 1. FIG. 4 shows the hatchback 3 at an opening angle equal to the second minimum opening angle $\beta$.

In the case of the present exemplary embodiment, the control unit 10 can turn on and off the taillights 5 and 6 automatically. In particular, it is provided in the case of the present exemplary embodiment that when the external lighting of the motor vehicle 1 is turned on, the control unit 10 automatically turns on the taillights 6 fastened to the passenger compartment 2 on the basis of the ascertained opening angle of the hatchback 3 when the opening angle of the hatchback 3 is greater than the second opening angle $\beta$. If the opening angle of the hatchback 3 is less than the second opening angle $\beta$, the control unit 10 automatically turns off the taillights 6 fastened on the passenger compartment 2. The control unit 10 simultaneously turns off the taillights 5 fastened on the hatchback 3 when the opening angle of the hatchback 3 is greater than the second opening angle β. If the opening angle is less than the second opening angle β, in the case of the present exemplary embodiment, the control unit 10 turns the taillights 5 fastened on the hatchback 3 on again.

In the case of the present exemplary embodiment, it is still provided that when the external lighting is turned on and at an opening angle of the hatchback 3 between the first minimum opening angle α and the second minimum opening angle β, the motor vehicle 1 outputs an acoustic warning signal using a loudspeaker 11 or a visual warning signal using a light 12 situated in the passenger compartment 2. Additionally or alternatively, it can also be provided that at the listed opening angles and with the external lighting turned on, the motor vehicle 1 cannot be started.

Figure 5:
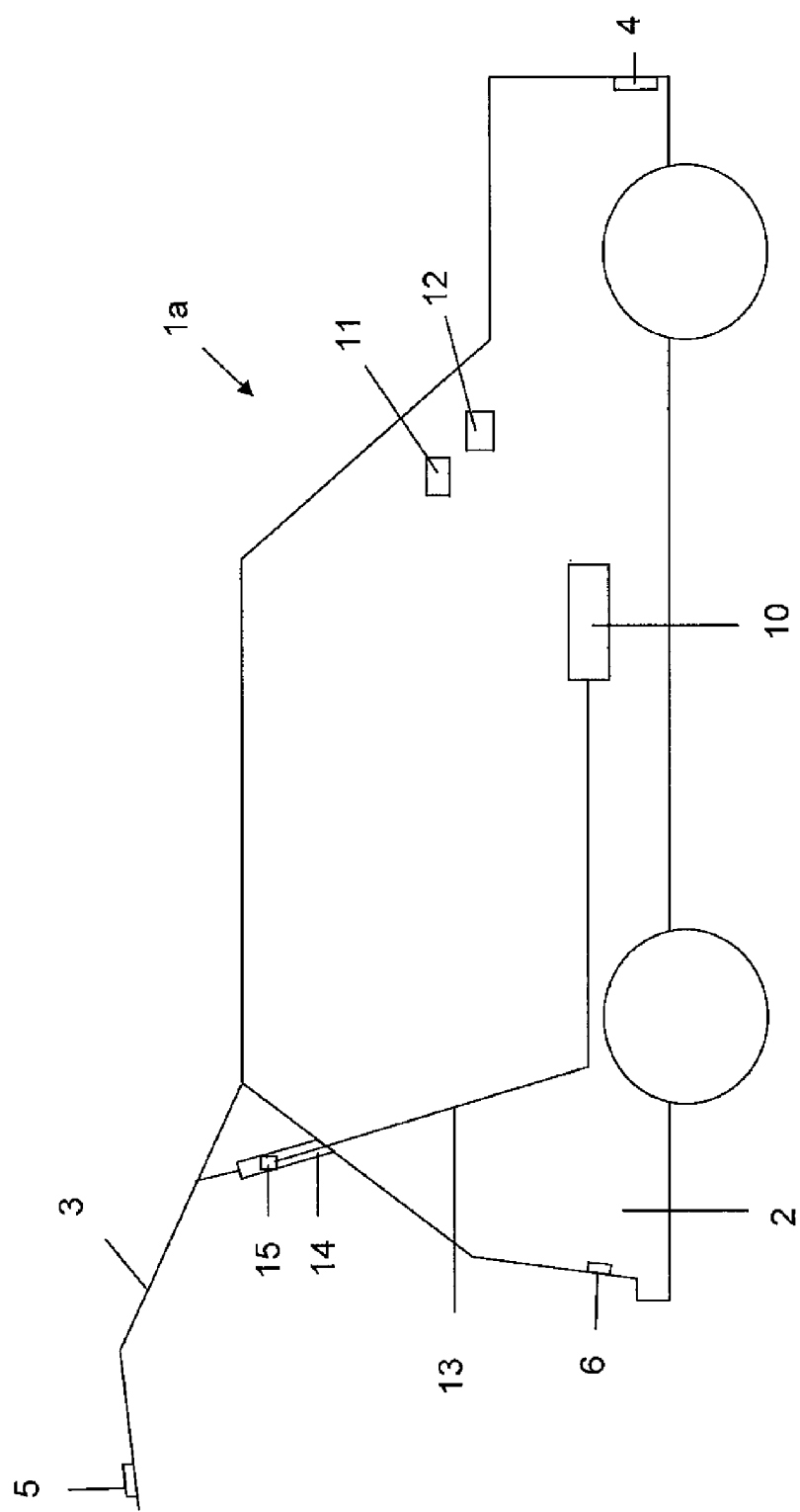
FIG. 5 shows a further motor vehicle having a hatchback.

FIG. 5 shows a further motor vehicle 1a having a hatchback, which is situated so it is pivotable on the passenger compartment thereof. If not otherwise described hereafter, components of the motor vehicle 1a shown in FIG. 5, which are at least substantially identical in construction and function to components of the motor vehicle 1 shown in FIGS. 1-4, are provided with identical reference numerals.

The motor vehicle 1a shown in FIG. 5 essentially differs from the motor vehicle 1 shown in FIGS. 1-4 through an automatic electrical hatchback system 14, using which the hatchback 3 can be automatically opened and closed. The hatchback system 14 comprises an angle sensor 15 and is connected to the control unit 10 using an electrical line 13. The control unit 10 can turn on and off the taillights 5, 6 as described above on the basis of the measured opening angle of the hatchback 3 using the angle sensor 15 of the hatchback system 14.

Figure 6:
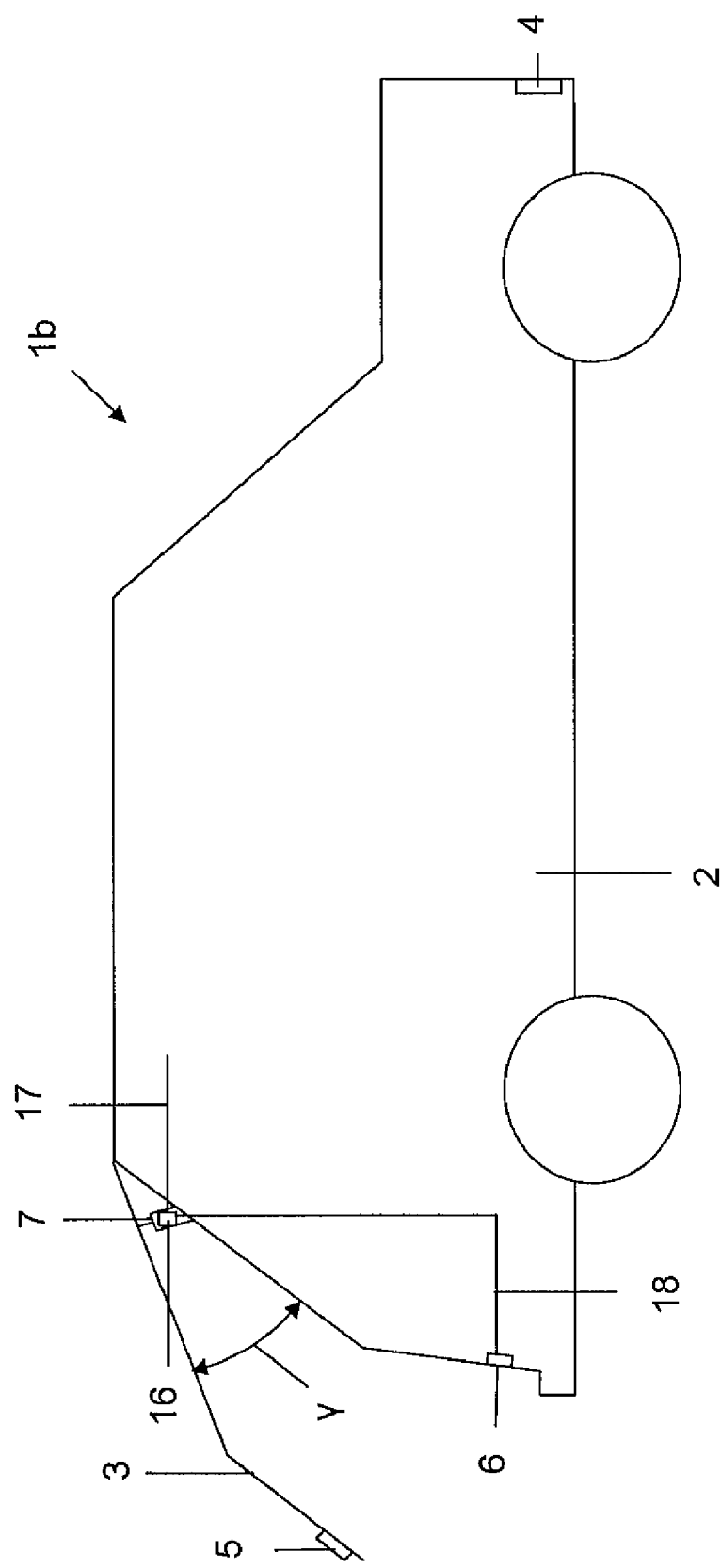
FIG. 6 shows a further motor vehicle having a hatchback.

FIG. 6 shows a further motor vehicle 1b having a hatchback which is situated so it is pivotable on the passenger compartment thereof. If not otherwise described hereafter, components of the motor vehicle 1b shown in FIG. 6, which are at least substantially identical in construction and function to components of the motor vehicle 1 shown in FIGS. 1-4, are provided with identical reference numerals.

The motor vehicle 1b shown in FIG. 6 essentially differs from the motor vehicle 1 shown in FIGS. 1-4 through a switch contact 16, which is integrated in the gas-filled spring 7 in the case of the present exemplary embodiment. The switch contact 16 is connected between electrical lines 17, 18, which optionally supply the taillights 6 fastened to the passenger compartment 2 with electrical power. The switch contact 16 is integrated on the gas-filled spring 7 so that it produces an electrical contact between the electrical line 17, 18 when the opening angle of the hatchback 3 is greater than the minimum opening angle γ of the hatchback 3 shown in FIG. 6. If the opening angle of the hatchback 3 is less than the minimum opening angle γ, the switch contact 16 interrupts the electrical contact between the electrical line 17, 18. The taillights 6 fastened on the passenger compartment 2 are thus turned on at opening angles of the hatchback 3 greater than the minimum opening angle γ and turned off at opening angles of the hatchback 3 less than the minimum opening angle γ.

In the case of the present exemplary embodiment, the switch contact 16 is additionally also implemented so that it turns off the taillights 5 fastened on the hatchback 3 at opening angles of the hatchback 3 greater than the minimum opening angle γ and turns them on at opening angles of the hatchback 3 less than the minimum opening angle γ.

The described motor vehicles 1, 1a, 1b are so-called station wagons. This is not required. The motor vehicles 1, 1a, 1b may also have a fastback or be a sedan. The hatchback 3 can also be a trunk lid.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

LIST OF REFERENCE NUMERALS

1, 1a, 1b motor vehicle
2 passenger compartment
3 hatchback
4 headlight
5, 6 taillights
7 gas-filled spring
8 angle sensor
9 electrical line
10 control unit
11 loudspeaker
12 light
13 electrical line
14 hatchback system
15 angle sensor
16 switch contact
17, 18 electrical lines
α, β, γ minimum opening angle

The invention claimed is:

1. A motor vehicle, comprising:
a passenger compartment;
a hatchback that is mounted to pivot on the passenger compartment; and
external lighting comprising taillights that are fastened on the hatchback and additional taillights that are concealed when the hatchback is closed and visible from outside the motor vehicle when the hatchback is open, wherein the additional taillights are automatically turned on by a controller when an opening angle of the open hatchback is greater than a minimum opening angle.

2. The motor vehicle according to claim 1, further comprising an angle measuring device that is configured to ascertain the opening angle of the hatchback.

3. The motor vehicle according to claim 2, wherein the angle measuring device is part of a device for automatically opening the hatchback.

4. The motor vehicle according to claim 2, further comprising a gas-filled spring adapted to dampen the movement of the hatchback, wherein the angle measuring device is situated in the gas-filled spring.

5. The motor vehicle according to claim 2, wherein the controller comprises an analysis device that is adapted to analyze the opening angle ascertained by the angle measuring device and turn on and off at least one of additional taillights and the taillights of the external lighting on the basis of the analyzed opening angle.

6. The motor vehicle according to claim 1, further comprising a switch contact that automatically turns on the additional taillights when the opening angle of the hatchback exceeds the minimum opening angle.

7. The motor vehicle according to claim 1, wherein the motor vehicle generates a warning signal if an opening angle of the open hatchback is greater than the first minimum opening angle, but less than a second minimum opening angle, the first minimum opening angle being less than the second minimum opening angle.

8. The motor vehicle according to claim 7, wherein the hatchback at least partially conceals the additional taillights only at opening angles less than the second minimum opening angle, automatically turns on the additional taillights at opening angles of the hatchback greater than the second minimum opening.

9. The motor vehicle according to claim 7, wherein the emission angle of light of the taillights of the external lighting is sufficient to meet legal requirements only at opening angles of the hatchback less than the first minimum opening angle.

10. The motor vehicle according to claim 1, wherein the taillights of the external lighting are automatically turned off when the opening angle of the open hatchback is greater than the minimum opening angle.

11. The motor vehicle according to claim 2, wherein the angle measuring device is part of a device for automatically closing the hatchback.

12. The motor vehicle according to claim 1, wherein the motor vehicle inhibits starting of the motor vehicle if an opening angle of the open hatchback is greater than the first minimum opening angle, but less than a second minimum opening angle, the first minimum opening angle being less than the second minimum opening angle.

13. A motor vehicle, comprising:
a passenger compartment;
a hatchback that is mounted to pivot on the passenger compartment;
external lighting comprising taillights that are fastened on the hatchback and additional taillights that are concealed when the hatchback is closed and visible from outside the motor vehicle when the hatchback is open, wherein the additional lights are automatically turned on when an opening angle of the open hatchback is greater than a minimum opening angle;
an angle measuring device that is configured to ascertain the opening angle of the hatchback; and
a gas-filled spring adapted to dampen the movement of the hatchback, wherein the angle measuring device is situated in the gas-filled spring.

14. A motor vehicle, comprising:
a passenger compartment;
a hatchback that is mounted to pivot on the passenger compartment; and
external lighting comprising taillights that are fastened on the hatchback and additional taillights that are concealed when the hatchback is closed and visible from outside the motor vehicle when the hatchback is open, wherein the taillights are automatically turned off when an opening angle of the open hatchback is greater than a minimum opening angle.

15. The motor vehicle of claim 14, wherein the additional taillights are automatically turned on by a controller when an opening angle of the open hatchback is greater than a minimum opening angle.

* * * * *